United States Patent
Huang et al.

(10) Patent No.: US 12,339,717 B2
(45) Date of Patent: Jun. 24, 2025

(54) DISCRETE TIME LOOP BASED THERMAL CONTROL

(71) Applicant: Taiwan Semiconductor Manufacturing Co., Ltd., Hsin-Chu (TW)

(72) Inventors: Jui-Cheng Huang, Hsinchu (TW); Yi-Hsing Hsiao, Hsin-Chu (TW); Yu-Jie Huang, Hsin-Chu (TW); Tung-Tsun Chen, Hsinchu (TW); Allen Timothy Chang, Hsinchu (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 0 days.

(21) Appl. No.: 18/582,482

(22) Filed: Feb. 20, 2024

(65) Prior Publication Data
US 2024/0192744 A1    Jun. 13, 2024

Related U.S. Application Data

(63) Continuation of application No. 17/543,542, filed on Dec. 6, 2021, now Pat. No. 11,934,239, which is a (Continued)

(51) Int. Cl.
*G06F 1/04*    (2006.01)
*G06F 1/12*    (2006.01)
(Continued)

(52) U.S. Cl.
CPC ............... *G06F 1/206* (2013.01); *G06F 1/04* (2013.01)

(58) Field of Classification Search
CPC .................................. G06F 1/206; G06F 1/04
See application file for complete search history.

(56) References Cited

U.S. PATENT DOCUMENTS

| | | | |
|---|---|---|---|
| 5,504,306 | A | 4/1996 | Russell et al. |
| 5,646,672 | A | 7/1997 | Fukushima |
| | | (Continued) | |

FOREIGN PATENT DOCUMENTS

| | | | |
|---|---|---|---|
| CN | 1621977 A | 6/2005 | |
| CN | 101650223 A | 2/2010 | |
| | (Continued) | | |

OTHER PUBLICATIONS

Toumazou, C. et al., "Simultaneous DNA amplification and detection using a pH-sensing semiconductor system", Nature Methods, Jul. 2013, 10(7):641-648.

(Continued)

*Primary Examiner* — Mohammed H Rehman
(74) *Attorney, Agent, or Firm* — STUDEBAKER BRACKETT PLLC (57) ABSTRACT

In an embodiment, a circuit includes: an error amplifier; a temperature sensor, wherein the temperature sensor is coupled to the error amplifier; a discrete time controller coupled to the error amplifier, wherein the discrete time controller comprises digital circuitry; a multiple bits quantizer coupled to the discrete time controller, wherein the multiple bits quantizer produces a digital code output; and a heating array coupled to the multiple bits quantizer, wherein the heating array is configured to generate heat based on the digital code output.

20 Claims, 11 Drawing Sheets

Related U.S. Application Data continuation of application No. 16/441,637, filed on Jun. 14, 2019, now Pat. No. 11,209,878.

(60) Provisional application No. 62/712,685, filed on Jul. 31, 2018.

(51) Int. Cl.
*G06F 1/20* (2006.01)
*G06F 5/06* (2006.01)

(56) References Cited

U.S. PATENT DOCUMENTS

| | | | |
|---|---|---|---|
| 5,675,366 | A | 10/1997 | Hayasaki et al. |
| 6,293,655 | B1 | 9/2001 | Imanaka et al. |
| 6,684,941 | B1 * | 2/2004 | Cao ............... F28D 15/0266 165/104.25 |
| 8,031,010 | B1 | 10/2011 | Berquist et al. |
| 9,176,508 | B2 | 11/2015 | Geissler et al. |
| 9,816,872 | B2 | 11/2017 | Zhang et al. |
| 11,209,878 | B2 | 12/2021 | Huang et al. |
| 11,510,577 | B2 * | 11/2022 | Bozsak ............... A61B 5/0031 |
| 2002/0158652 | A1 | 10/2002 | Okayasu |
| 2004/0130357 | A1 | 7/2004 | Smith |
| 2005/0105204 | A1 * | 5/2005 | Bloodworth ........... G11B 21/21 |
| 2008/0234875 | A1 | 9/2008 | Nomura |
| 2010/0131211 | A1 * | 5/2010 | Shipley ............... G01N 3/60 702/43 |
| 2012/0105151 | A1 | 5/2012 | Nakamura et al. |
| 2014/0028774 | A1 * | 1/2014 | Caporossi ............. B41J 2/3555 347/211 |
| 2014/0161278 | A1 | 6/2014 | Konno et al. |
| 2015/0085054 | A1 * | 3/2015 | Omoto ................. B41J 2/36 347/180 |
| 2018/0081308 | A1 | 3/2018 | Cao |
| 2020/0020366 | A1 | 1/2020 | Tezuka |
| 2020/0398579 | A1 | 12/2020 | Gardner et al. |

FOREIGN PATENT DOCUMENTS

| | | |
|---|---|---|
| JP | S63111504 A | 5/1988 |
| JP | H0540525 A | 2/1993 |

OTHER PUBLICATIONS

Scorzoni, A. et al., "Accurate Analog Temperature Control of a Thin Film Microheater on Glass Substrate for Lab-on Chip Applications", Dept. of Engineering, University of Perugia, Italy, 2014, 4 pages.

Janssen, E. et al., "Basics of Sigma-Delta Modulation", Chapter 2, Look-Ahead Based Sigma-Delta Modulation, Analog Circuits and Signal Processing, 2011, pp. 5-28.

Graells, F.S., Integrated Heterogenous Systems Design (42838), "5. Delta-Sigma Modulators for ADC", pp. 1-46, retrieved from http:/Jwww.cnm.es/-pserra/uab/ihsd/class.html, Jul. 25, 2019.

Chen, T.T. et al.,"A Semiconductor Bio-electrical Platform with Addressable Thermal Control Circuits for Accelerated Bioassay Development," Taiwan Semiconductor Manufacturing Co., Ltd., Hsinchu, Taiwan, University of Illinois at Urbana-Champaign, Champaign, IL, 2014, pp. 1-4.

Department of Mechanical Engineering, 2.010 Control Systems Principles, Laboratory 8: PIO Position Control, pp. 1-4, retrieved from http:/Jweb.mit.edu/2.010/www.lab/RULES, Jul. 25, 2019.

Barranca, Mar, et al., "Using a Floating-Gate MOS Transistor as a Transducer in a MEMS Gas Sensing System," Sensors 2010, 10:10413-10434.

Ejaz, M., "PIO Control: A Tutorial for Physicists," Lab Engineer (Control Systems Lab), Department of Electrical Engineering LUMS, Apr. 23, 2016, pp. 1-31.

* cited by examiner

DISCRETE TIME LOOP BASED THERMAL CONTROL

CROSS-REFERENCE TO RELATED APPLICATIONS

This application is a continuation of U.S. patent application Ser. No. 17/543,542, filed Dec. 6, 2021, now U.S. Pat. No. 11,934,239, which is a continuation of U.S. patent application Ser. No. 16/441,637, filed Jun. 14, 2019, now U.S. Pat. No. 11,209,878, which claims priority to U.S. Provisional Application No. 62/712,685, filed Jul. 31, 2018, each of which are incorporated herein by reference in their entireties.

BACKGROUND

The semiconductor industry has progressed in pursuit of higher device density with lower cost. Technological advances in semiconductor device, or integrated circuit (IC), materials and design have produced progressively smaller and more complex circuits. In the course of semiconductor device evolution, functional density (for example, the number of interconnected devices per chip area) has generally increased while geometry sizes have decreased. This scaling down process generally provides benefits by increasing production efficiency and lowering associated costs. However, such scaling down has also increased the complexity of processing and manufacturing ICs and, for these advances to be realized, similar developments in IC design, processing, and manufacturing are needed.

BRIEF DESCRIPTION OF THE DRAWINGS

Aspects of the present disclosure are best understood from the following detailed description when read with the accompanying FIGURES. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the FIGURES. The spatially relative terms are intended to encompass different orientations of the device in use or operation in addition to the orientation depicted in the FIGURES. The apparatus may be otherwise oriented (rotated 90 degrees or at other orientations) and the spatially relative descriptors used herein may likewise be interpreted accordingly.

Systems and methods in accordance with various embodiments are directed to a discrete time loop based control system for use in various applications, such as thermal management (e.g., heating or cooling). This type of control system may be implemented using a modulator with a combination of an error amplifier, discrete time controller, quantizer, switched array, and a sensor. In certain embodiments, the switched array may be an array of switched heating elements and the sensor may be a temperature sensor. For example, the delta sigma modulator may track a desired temperature setting as a reference value input. The modulator may force an output (e.g., temperature produced by a heater as a sensed output measurement value) to track the reference value input (e.g., the desired temperature setting). Accordingly, the temperature produced by the heater may be a sensed output measurement value produced by the sensor. The discrete time controller may be configured to stabilize the loop (e.g., the entirety) of the discrete time loop based control system. Loop filter coefficients of the discrete time controller can be tuned through adjusting an operational frequency or integrating a switched capacitor bank. A multiple bit quantizer can suppress a temperature ripple as the loop settles. Quantizer noise can be filtered out and the quantizer's output can be used as digital code to directly control the switched array.

The switched array may include a plurality of switched heating elements. In certain embodiments, the switched array may also be referred to as a heating array. Each of the switched heating elements may include a heating component (e.g., a resistor) connected to a switch. The switched heating elements may be controlled by having the switch be ON (e.g., closed) or OFF (e.g., open) to decide whether the heating component is performing a heating function or not. Accordingly, the each switched heating element can be controlled by a logical signal (e.g., a multiple bit digital code). Furthermore, the total heating power may be proportional with the digital code. Although this application refer to discrete time loop control for thermal control, this type of discrete time loop based control may be applied to any other type of tracking system beyond thermal control.

Figure 1A:
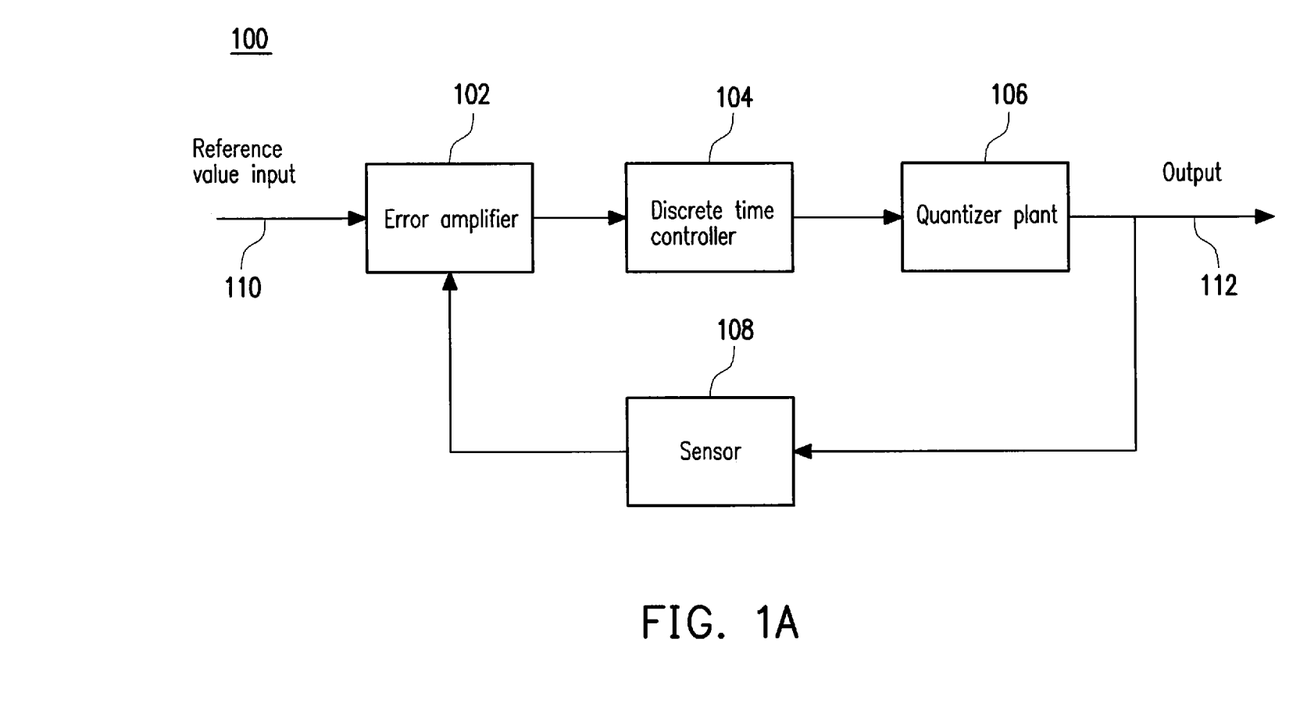
FIG. 1A is a block diagram of a discrete time loop based control system, in accordance with some embodiments.

FIG. 1A is a block diagram of a discrete time loop based control system 100, in accordance with some embodiments. The control system 100 may be implemented with different blocks for an error amplifier 102, a discrete time controller 104, a quantized plant 106, and a sensor 108. Also, the control system may receive, as input, a reference value input 110 and produce an output 112 from the quantized plant 106.

As opposed to being implemented with analog circuitry, the discrete time loop based control system 100 may be implemented with digital circuitry. For example, as will be discussed further below, a plant may refer to a process and an actuator. More specifically, the quantized plant 106 may reference a plant with a digital (e.g., quantized) process. For example, the quantized plant 106 may include a quantizer that produces a digital code for control of a heater.

Also, the discrete time controller 104 may be implemented using digital circuitry. For example, the discrete time controller 104 may utilize at least one of an integrator controller, a proportional and integrator controller, or a proportional integral derivative controller. The sensor 108 may be any type of sensor configured to produce an output measurement value that characterizes the output of the quantized plant.

In operation, the error amplifier 102 may take, as inputs, the reference value input 110 and the output measurement value. Then, the error amplifier 102 may determine an error value as input to the discrete time controller 104. The discrete time controller 104 may produce a control signal to the quantized plant 106 to control the quantized plant 106 For example, the discrete time controller 104, based on the error value produce by the error amplifier 102, may control the digital code produced by the quantizer of the quantized plant. This digital code may be utilized to produce an output, such as heat, which may be measured by the sensor 108 for a new output measurement value that is fed back to the error amplifier 102. As will be discussed further below, by being implemented in digital circuitry rather than analog circuitry, the discrete time loop based control system 100 may produce space savings while meeting and/or exceeding the performance of equivalent analog circuitry.

Figure 1B:
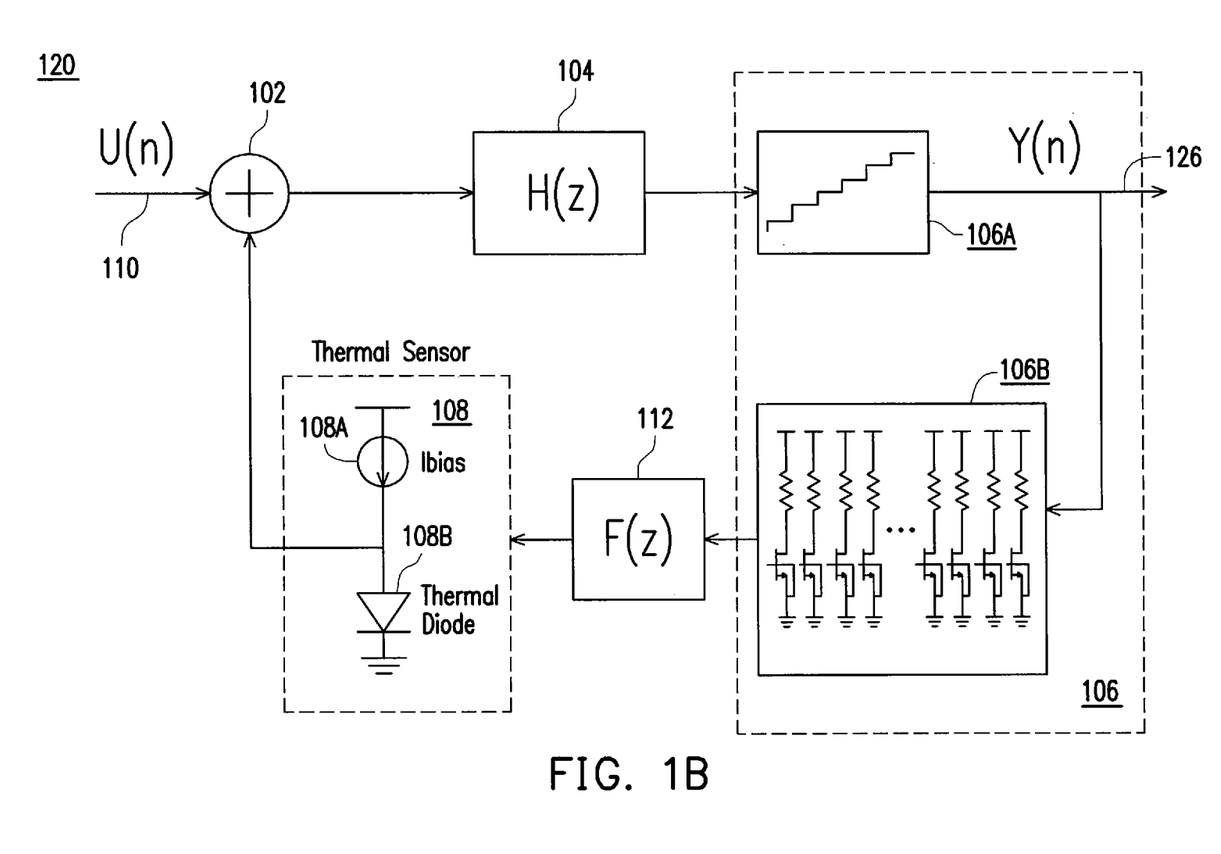
FIG. 1B is a block diagram of the discrete time loop based control system represented as a modulator transfer function, in accordance with some embodiments.

FIG. 1B is a block diagram of the discrete time loop based control system represented with a modulator transfer function 120, in accordance with some embodiments. The modulator transfer function 120 may represent the input 110 as a function U(n), the discrete time controller 104 as a function H(z), and the output 112 as a function F(z). Also illustrated is the error amplifier 102 and the sensor 108 (e.g., a thermal sensor). The thermal sensor may be implemented with a current source 108A and a thermal diode 108B.

The quantized plant 106 may be represented as a quantizer 106A and a switched heating array 106B (e.g., a switched array). The quantizer 106A may produce a quantizer output 126, represented as a function Y(n). The quantizer output 126 may be a multiple bit digital code that may be utilized to individually control different switches of the switched heating array 106B. Accordingly, the output 112, as the function F(z), may represent the heat produced by (e.g., generated by) the switched heating array 106B and measured by the sensor 108.

Figure 1C:
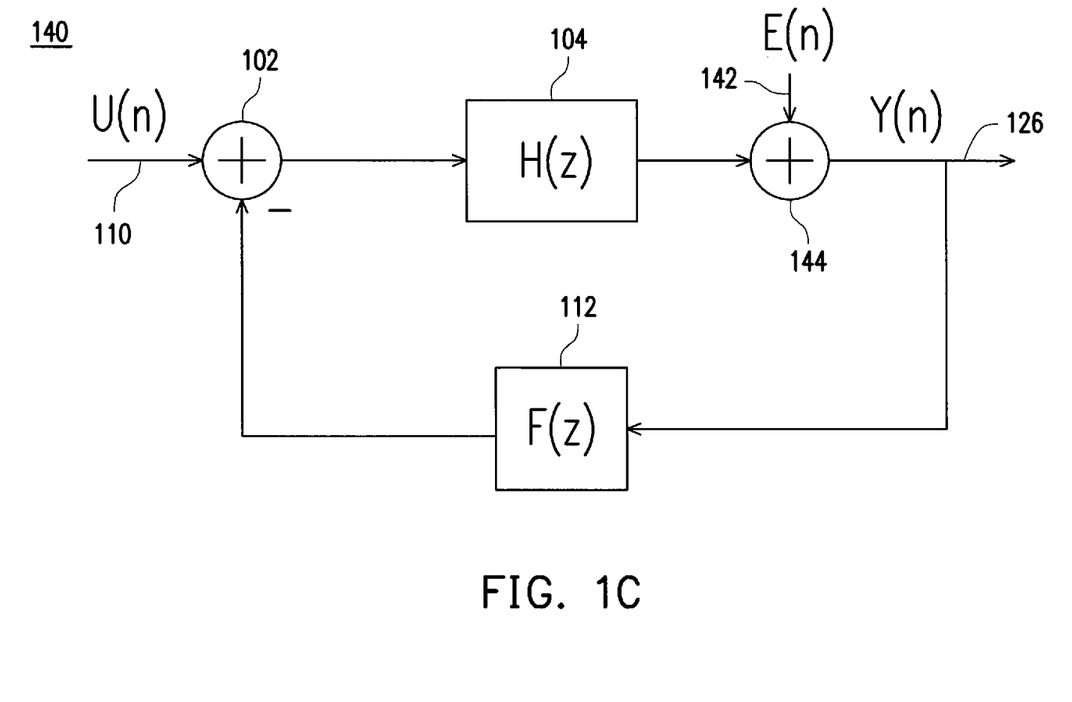
FIG. 1C is a block diagram of the discrete time loop based control system represented as a linear modulator, in accordance with some embodiments.

FIG. 1C is a block diagram of the discrete time loop based control system represented as a linear modulator 140, in accordance with some embodiments. The linear modulator 140 may represent the input 110 as the function U(n), the discrete time controller 104 as the function H(z), and the output 112 as the function F(z). Also illustrated is the error amplifier 102. Here, the linear modulator 140 may represent a degree of error 142 introduced by the quantized plant 106. This amount of error may be summed 144 with the output from the discrete time controller 104 as the function H(z). This linear model may be simplified as it does not have, for example, an explicit representation of the quantizer, switched heating array, or the sensor referenced above.

Based on this linear modulator 140, the signal transfer function, STF(z), may be represented by the below equation (1) when the functions are represented in a common domain (e.g., the discrete z domain):

$$STF(z) = \frac{Y(z)}{U(z)} = \frac{H(z)}{1 + F(z)H(z)} \qquad (1)$$

As noted above, Y(z) represents the quantizer output as a function, U(z) represents the input signal as a function, F(z) represents the output as a function, and H(z) represents the discrete time controller as a function.

Also, the noise transfer function may be represented by the following equation (2) when the functions are represented in a common domain (e.g., in the discrete z domain):

$$NTF(z) = \frac{Y(z)}{E(z)} = \frac{1}{1 + F(z)H(z)} \qquad (2)$$

As noted above, E(z) represents the error as a function. Accordingly, if H(z) is represented as an integrator, then when H(z)=∞, STF(dc)=1, and NTF (dc)=0. Stated another way, error will be effectively removed and the output will not be effected by noise if H(z) represents a digital implementation.

Figure 1D:
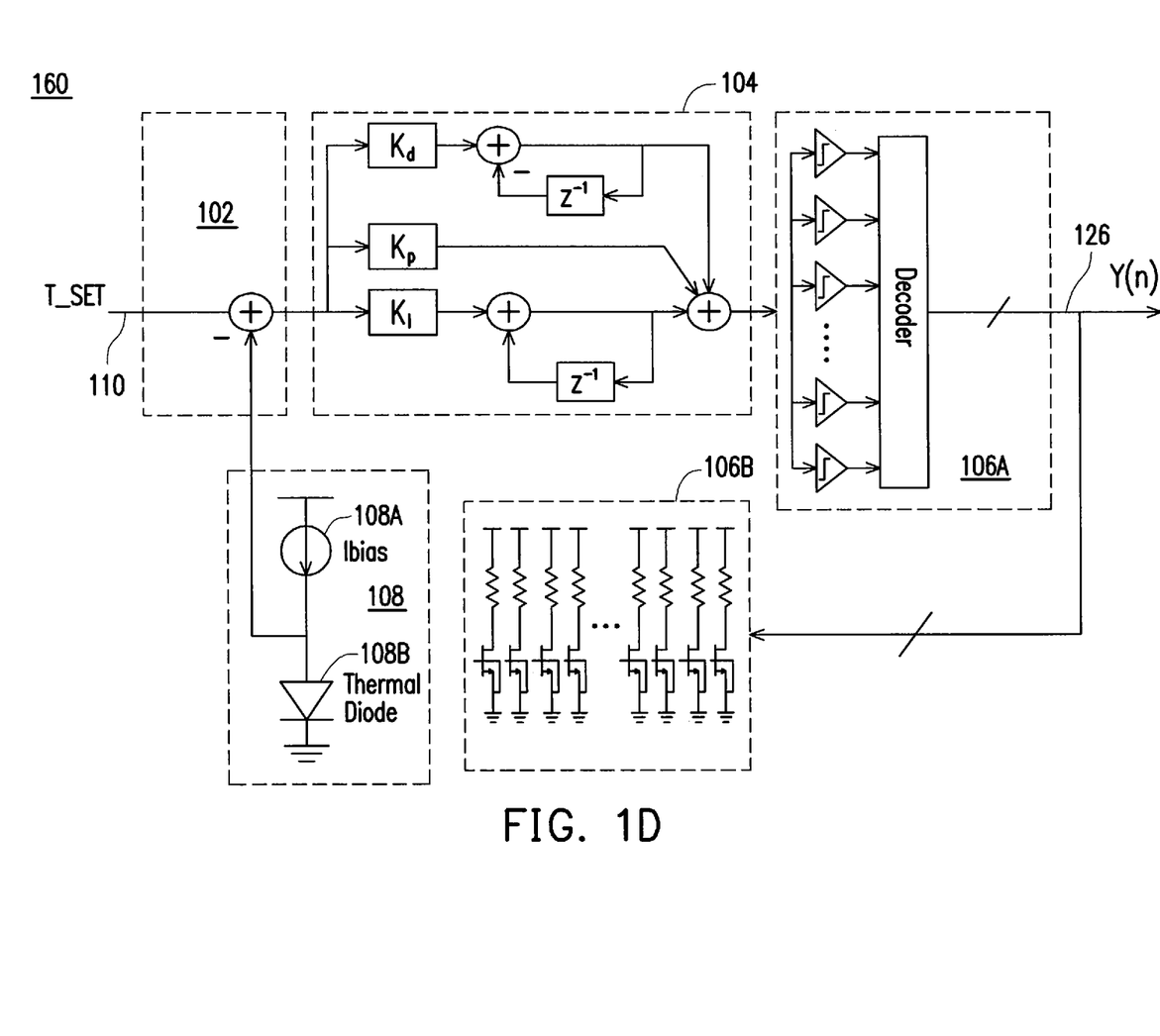
FIG. 1D is a block diagram of the discrete time loop based control system represented as a delta sigma thermal control loop, in accordance with some embodiments.

FIG. 1D is a block diagram of the discrete time loop based control system represented as a delta sigma thermal control loop 160, in accordance with some embodiments. The delta sigma thermal control loop 160 may be implemented with the error amplifier 102, the discrete time controller 104 (e.g., as a discrete time control loop), the quantizer 106A, the switched heating array 106B, and the sensor 108. Also, the delta sigma thermal control loop 160 may receive, as input, a reference value input 110 (e.g., T_SET, or a temperature setting) and produce the quantizer output 126 (e.g., function Y(n)). As discussed above, the quantizer 106A, the switched heating array 106B, and the quantizer output 126 may be referred to as the quantized plant.

In operation, the error amplifier 102 may take, as inputs, the reference value input 110 and the output measurement value produced by the sensor 108. In certain embodiments, the sensor may be implemented as a current source 108A and a thermal diode 108B. Then, the error amplifier 102 may determine an error value as input to the discrete time controller 104. In certain embodiments, the discrete time controller may be implemented as at least one of an integrator controller, a proportional and integrator controller, or a proportional integral derivative controller. In the illustrated embodiment, the discrete time controller 104 may be implemented as a proportional integral derivative controller. Also, by being discrete or digital, the discrete time controller 104 may be triggered by use of a clock. The discrete time controller 104 may produce a control signal to the quantizer 106A. This control signal may affect the way that the quantizer 106A produces the quantizer output 126 (e.g., Y(n)). Stated another way, the discrete time controller 104, based on the error value produce by the error amplifier 102, may control the digital code produced by the quantizer of the quantized plant. This digital code may be utilized as an input for the various switches of the switched heating array 106B. In certain embodiments, this digital code may be a multiple bit code for more fine-tuned control of the switched heating array than a single bit code. As will be discussed below, the switched heating array may include a switch type heating circuit where the switch is connected with ground and the heating resistor is connected with a voltage source. Also, in certain embodiments, the switched heating array may be monotonic. The sensor 108 may be embedded among the individual heating elements of the switched heating array 106B to continuously produce the output measurement value, which is fed to the error amplifier 102.

As noted above, the delta sigma thermal control loop 160 may be implemented utilizing digital circuitry to produce digital outputs and for digital control of the delta sigma thermal control loop 160. Accordingly, by being implemented in digital circuitry rather than analog circuitry, the delta sigma thermal control loop 160 may produce space savings while meeting and/or exceeding the performance of equivalent analog circuitry. Each of the components of the delta sigma thermal control loop 160 will be discussed in further detail below.

Figure 2A:
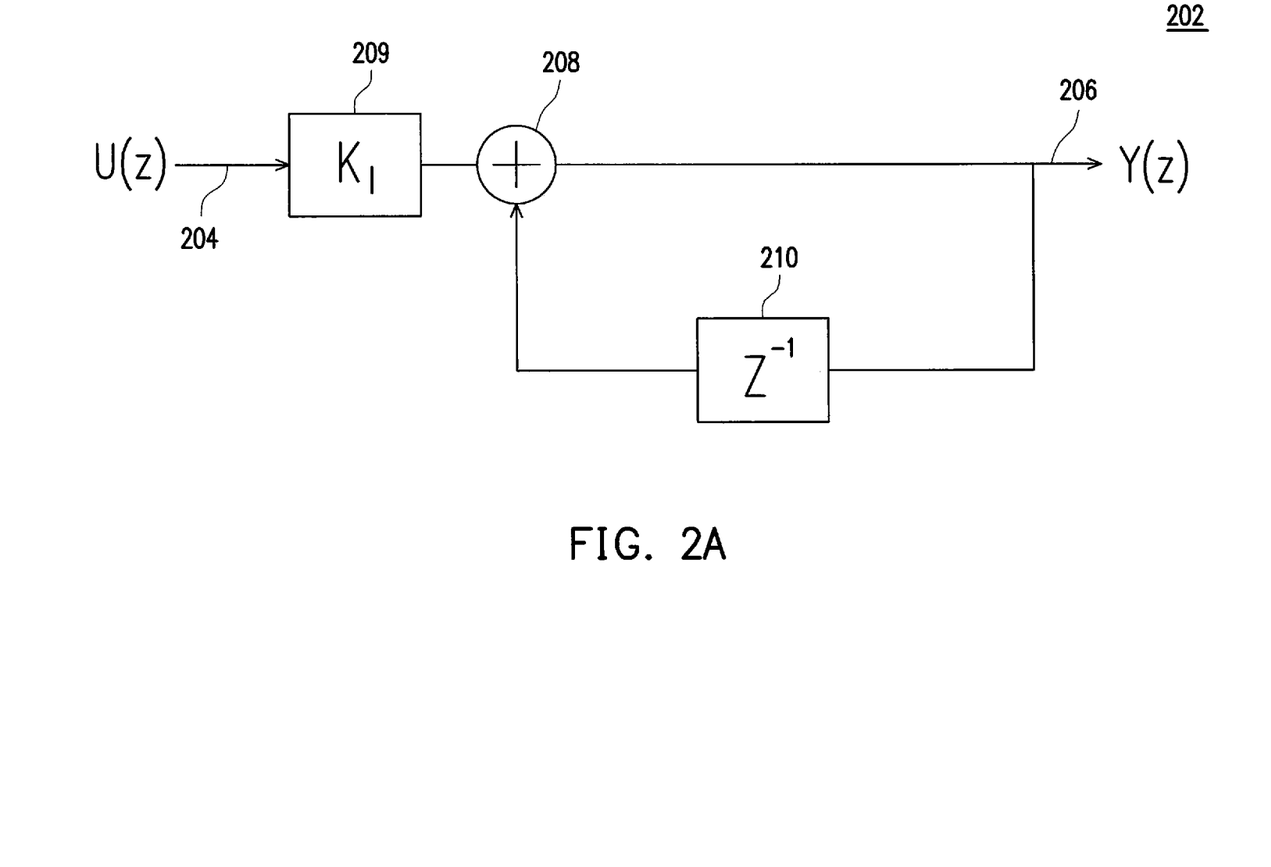
FIG. 2A is a block diagram that illustrates the discrete time controller implemented as an integrator controller, in accordance with some embodiments.

FIG. 2A is a block diagram that illustrates the discrete time controller implemented as an integrator controller 202, in accordance with some embodiments. The integrator controller 202 may include an input signal 204 (e.g., function U(z)), an output signal 206 (e.g., function Y(z)), a first summer 208, an integration amplification factor 209 (e.g., $K_I$), and a time delay 210 (e.g., Z–1). The transfer function of this integrator controller 202 may be represented by the following equation (3) when the functions are represented in a common domain (e.g., in the discrete z domain):

$$H(z) = \frac{K_I}{z-1} \quad (3)$$

In operation, the input signal 204 (e.g., function U(z)) may be processed by the integration amplification factor 209 (e.g., $K_I$). The integration amplification factor may be a factor scaled proportionally to an amount of error noted by the error amplifier. The first summer 208 may sum the time delay 210 (e.g., $Z^{-1}$) and the input signal 204 (e.g., function U(z)) as processed by the integration amplification factor 209 (e.g., $K_I$) to produce the output signal 206 (e.g., function Y(z)).

Figure 2B:
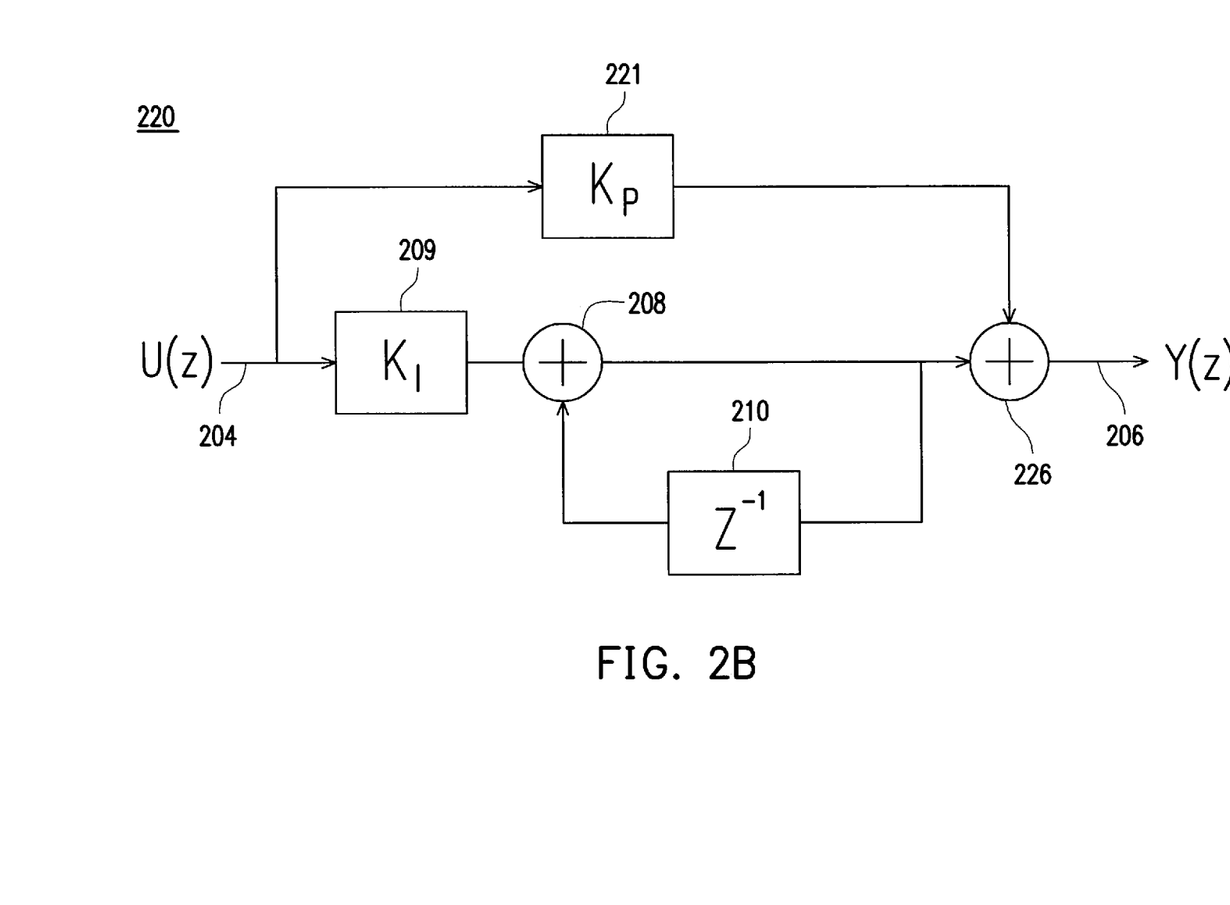
FIG. 2B is a block diagram that illustrates the discrete time controller implemented as a proportional and integrator controller, in accordance with some embodiments.

FIG. 2B is a block diagram that illustrates the discrete time controller implemented as a proportional and integrator controller 220, in accordance with some embodiments. The proportional and integrator controller 220 may include the input signal 204 (e.g., function U(z)), an output signal 206 (e.g., function Y(z)), a first summer 208, an integration amplification factor 209 (e.g., $K_I$), a proportional amplification factor 221 (e.g., $K_P$), and a time delay 210 (e.g., $Z^{-1}$). The proportional amplification factor 221 may be a factor scaled based on an amount of error (as noted by the error amplifier) and the time that the error has persisted. The first summer 208 may sum the time delay 210 (e.g., $Z^{-1}$) and the input signal 204 (e.g., function U(z)) as processed by the integration amplification factor 209 (e.g., $K_I$). In addition, a second summer 226 may sum the summed output of the first summer 208 with the input signal 204 (e.g., function U(z)) as processed by the proportional amplification factor 221 (e.g., $K_P$)

In operation, the input signal 204 (e.g., function U(z)) may be processed by the integration amplification factor 209 (e.g., $K_I$) and the proportional amplification factor 221 (e.g., $K_P$). The first summer 208 may sum the time delay 210 (e.g., $Z^{-1}$) and the input signal 204 (e.g., function U(z)) as processed by the integration amplification factor 209 (e.g., $K_I$). The second summer 226 may sum the summed output of the first summer 208 with the input signal 204 (e.g., function U(z)) as processed by the proportional amplification factor 221 (e.g., $K_P$) to produce the output signal 206 (e.g., function Y(z)).

The transfer function of this proportional and integrator controller 220 may be represented by the following equation (4) when the functions are represented in a common domain (e.g., in the discrete z domain):

$$H(z) = K_P + \frac{K_I}{z-1} \quad (4)$$

It can be noted that ($K_I/(z-1)$) may represent the transfer function of the integrator controller 220.

Figure 2C:
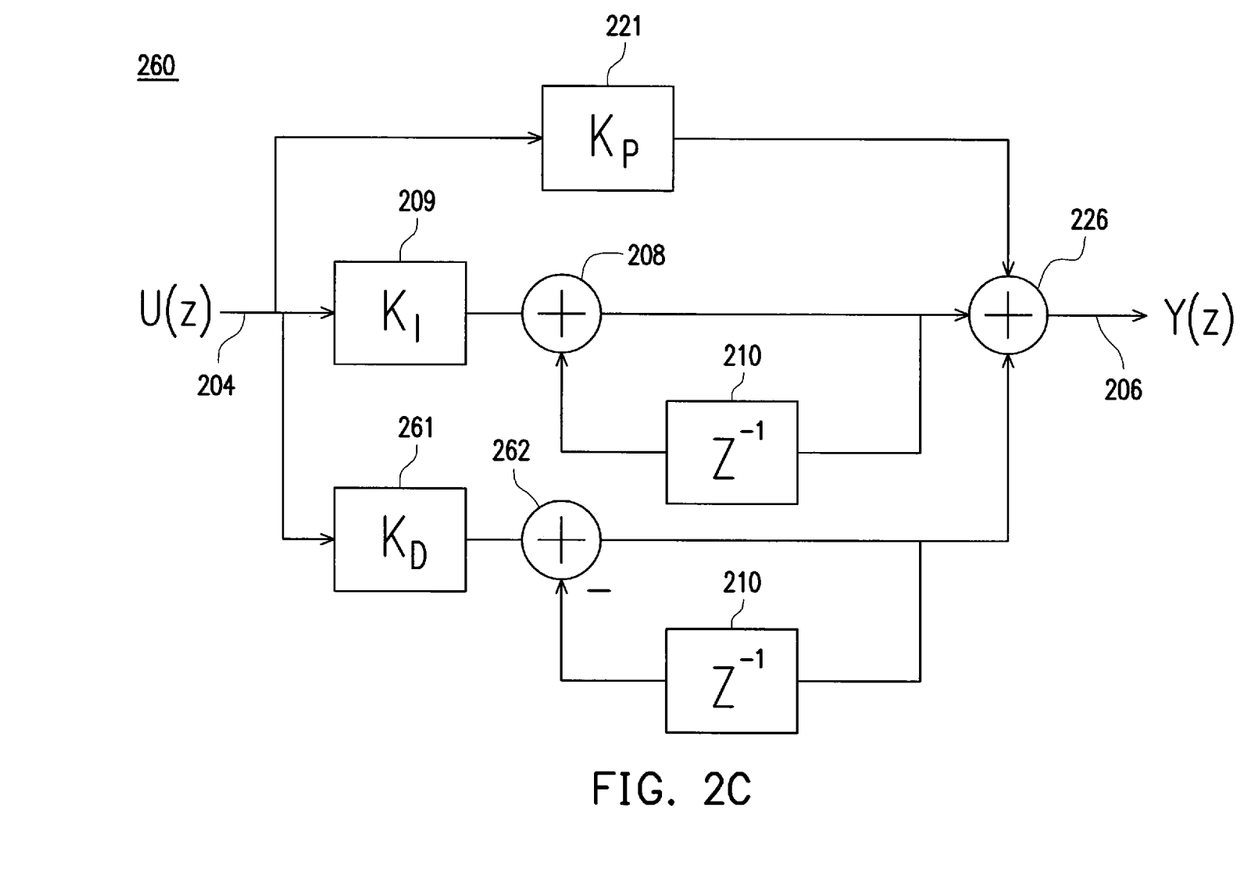
FIG. 2C is a block diagram that illustrates the discrete time controller implemented as a proportional integral derivative controller, in accordance with some embodiments.

FIG. 2C is a block diagram that illustrates the discrete time controller implemented as a proportional integral derivative controller 260, in accordance with some embodiments. The proportional integral derivative controller 260 may include the input signal 204 (e.g., function U(z)), the output signal 206 (e.g., function Y(z)), the first summer 208, the integration amplification factor 209 (e.g., $K_I$), the proportional amplification factor 221 (e.g., $K_P$), the time delay 210 (e.g., $Z^{-1}$), the second summer 226, a derivative amplification factor 261 (e.g., $K_D$), and a third summer 262. The first summer 208 may sum the time delay 210 (e.g., $Z^{-1}$) and the input signal 204 (e.g., function U(z)) as processed by the integration amplification factor 209 (e.g., $K_I$). The derivative amplification factor 261 (e.g., $K_D$), may be a factor scaled based on a rate of change of error, as noted by the error amplifier. Furthermore, the third summer 262 may sum the time delay 210 (e.g., $Z^{-1}$) and the input signal 204 (e.g., function U(z)) as processed by the derivative amplification factor 261 (e.g., $K_D$). In addition, the second summer 226 may sum the summed output of the first summer 208 and the third summer 262 with the input signal 204 as processed by the proportional amplification factor 221 (e.g., $K_P$). In certain embodiments, the time delay summed by the first summer 208 may be different than the time delay summed with the third summer 262. However, in other embodiments, the time delay summed by the first summer 208 may be the same as the time delay summed with the third summer 262.

In operation, the input signal 204 (e.g., function U(z)) may be processed by the integration amplification factor 209 (e.g., $K_I$), the proportional amplification factor 221 (e.g., $K_P$), and the derivative amplification factor 261 (e.g., $K_D$). The first summer 208 may sum the time delay 210 (e.g., $Z^{-1}$) and the input signal 204 (e.g., function U(z)) as processed by the integration amplification factor 209 (e.g., $K_I$). The third summer 262 may sum the time delay 210 (e.g., $Z^{-1}$) and the input signal 204 (e.g., function U(z)) as processed by the derivative amplification factor 261 (e.g., $K_D$). The second summer 226 may sum the summed output of the first summer 208, and the third summer 262 with the input signal 204 (e.g., function U(z)) as processed by the proportional amplification factor 221 (e.g., $K_P$) to produce the output signal 206 (e.g., function Y(z)).

The transfer function of this proportional integral derivative controller 260 may be represented by the following equation (5) when the functions are represented in a common domain (e.g., in the discrete z domain):

$$H(z) = K_P + \frac{K_I}{z-1} + K_D(1-z^{-1}) \quad (4)$$

It can be noted that $K_P+(K_I/(z-1))$ may represent the transfer function of the proportional and integrator controller.

Figure 3:
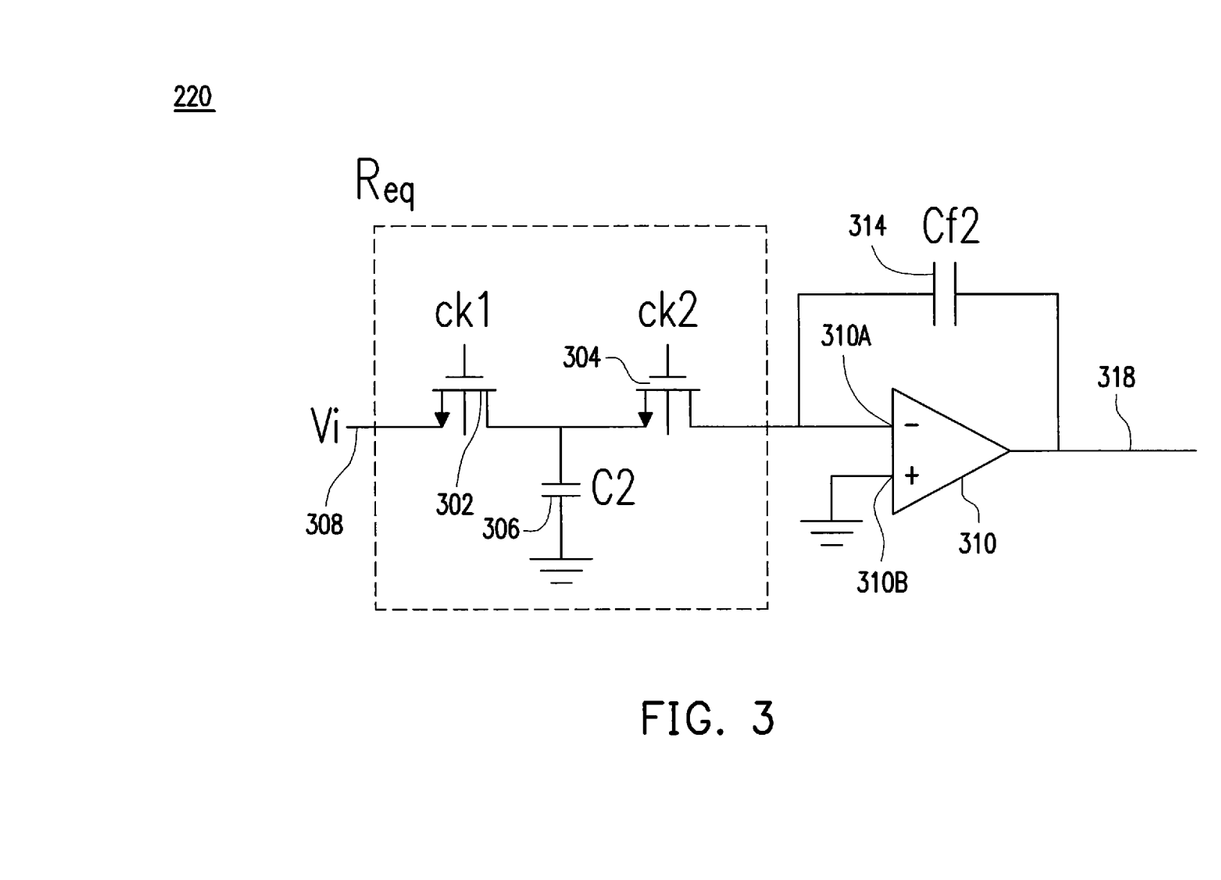
FIG. 3 is a circuit implementation of the integrator controller, in accordance with some embodiments.

FIG. 3 is a circuit implementation of the integrator controller 220, in accordance with some embodiments. The integrator controller 220 may be implemented with discrete or digital logic, as opposed to analog logic. Also, by being a discrete type of integrator controller, the integrator controller 220 may be run (e.g., driven) with clock signals. For example, a first clock signal (e.g., ck1) may serve as an input to a first switch 302 (e.g., be connected with a gate of the first switch 302B). Also, a second clock signal (e.g., ck2) may serve as an input to a second switch 304 (e.g., be connected with a gate of the second switch 304). Both of the first switch 302 and the second switch 304 may be connected with a capacitor 306 (e.g., C2). The capacitor 306 may also be connected with ground. The first switch 302 may further be connected to an input 308 (e.g., Vi). The second switch 304 may be further connected with an inverting input 310A of an operational amplifier 310. The combination of the first switch 302, the second switch 304, and the capacitor 306 may functionally be equivalent to a resistance (e.g., a resistor) but be implemented as digital logic. The operational amplifier 310 may include a capacitor 314 between the inverting input 310A and output 318 of the operational amplifier 310. The non-inverting input 310B of the operational amplifier 310 may be connected with ground.

In certain embodiments, the first and second clock signals may operate as a non-overlapping clock. This first and second clock signal may have a frequency that may be changed dynamically to track a plant bandwidth (e.g., of the quantized plant, introduced above). The equivalent resistance of the first switch 302, the second switch 304, and the capacitor 306 may be represented by the following equation (6):

$$R_{eq} = \frac{T_s}{C_2} \quad (6)$$

In equation (6), $R_{eq}$ represents the equivalent resistance value, $C_2$ represents the capacitance of capacitor 306, Ts represents the period of either the first or second clock signal, where both clock signals are non-overlapping clock signals with the same period.

Figure 4A:
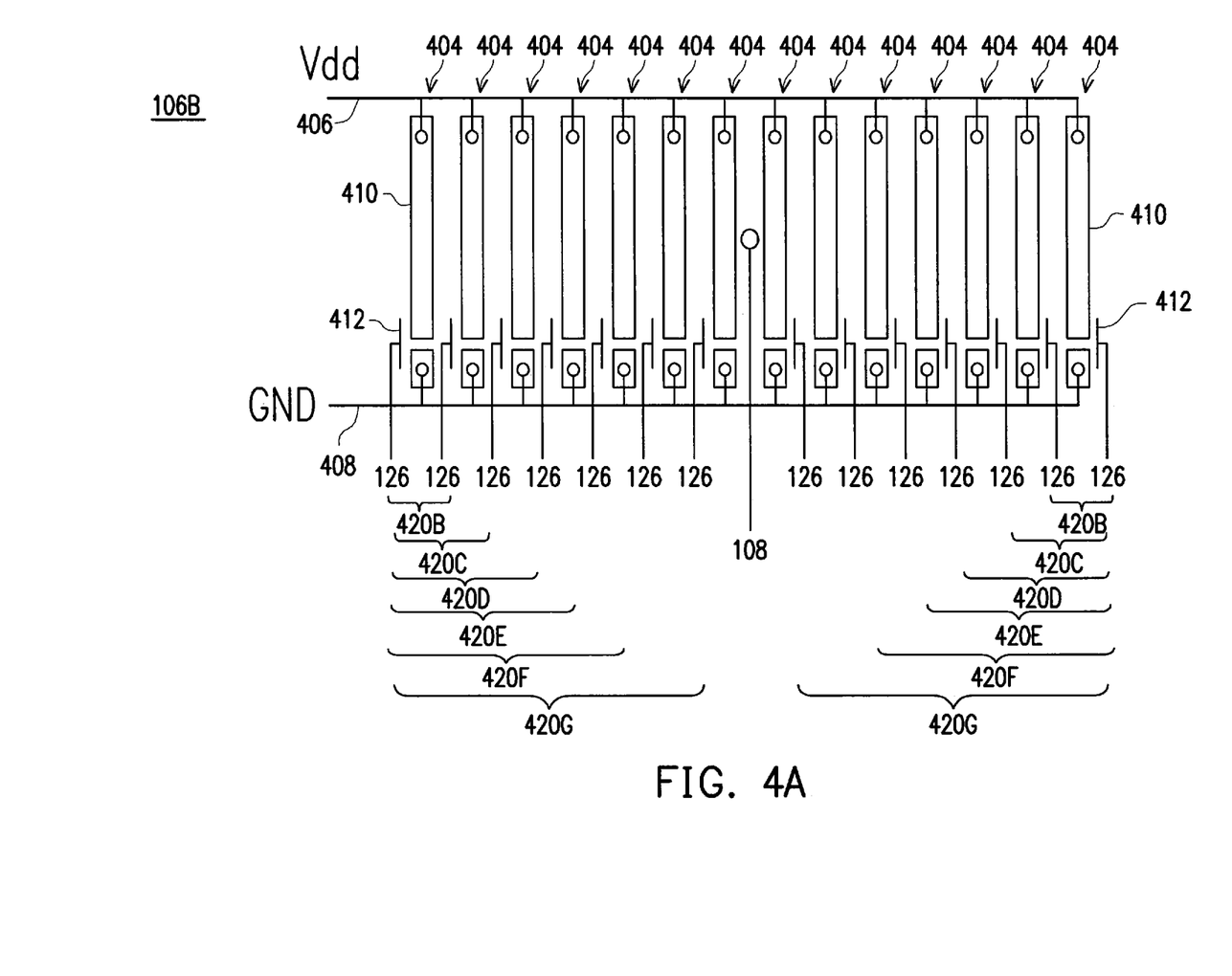
FIG. 4A illustrates the heating array, in accordance with some embodiments.

FIG. 4A illustrates the heating array 106B, in accordance with some embodiments. The heating array 106B may include multiple heating elements 404 arranged in parallel between a voltage source 406 (e.g., Vdd) and ground 408. Each of the heating elements 404 may include a resistor 410 and a switch 412. Accordingly, the resistor 410 of a heating element may be directly coupled to the voltage source 406 and a respective switch 412. Also, each switch 412 may be coupled between a respective resistor 410 and the ground 408. Also, the sensor 108 may be surrounded by various heating elements 404 of the heating array 106B. For example, the sensor 108 may be in the middle of the heating array in order to collect an output measurement value (e.g., temperature) produced by the heating array 106B.

As noted above, the quantizer may produce a quantizer output 126 as a digital code that may be utilized to individually control the different switches 412 of the heating array 106B. In certain embodiments, the quantizer output may represent a monotonic digital code that changes by only increasing the number of different switches 412 that are ON (e.g., closed). For example the monotonic digital code may begin with turning the switches ON that are associated with the heating elements furthest from the sensor 108. Stated another way, the monotonic digital code may begin to turn on the heating elements 404 that are furthest away from the sensor 108 in the middle of the heating array 106B. Then, to raise a temperature, the monotonic digital code may activate the adjacent heating elements so that a second set 420B of heating elements are on. Then, to raise the temperature, the monotonic digital code may activate the next adjacent heating elements so that a third set 420C of heating elements are on. Then, to raise the temperature, the monotonic digital code may activate the next adjacent heating elements so that a fourth set 420D of heating elements are on. Then, to raise the temperature, the monotonic digital code may activate the next adjacent heating elements so that a fifth set 420E of heating elements are on. Then, to raise the temperature, the monotonic digital code may activate the next adjacent heating elements so that a sixth set 420F of heating elements are on. Then, to raise the temperature, the monotonic digital code may activate the next adjacent heating elements so that a sixth set 420G of heating elements are on.

Figure 4B:
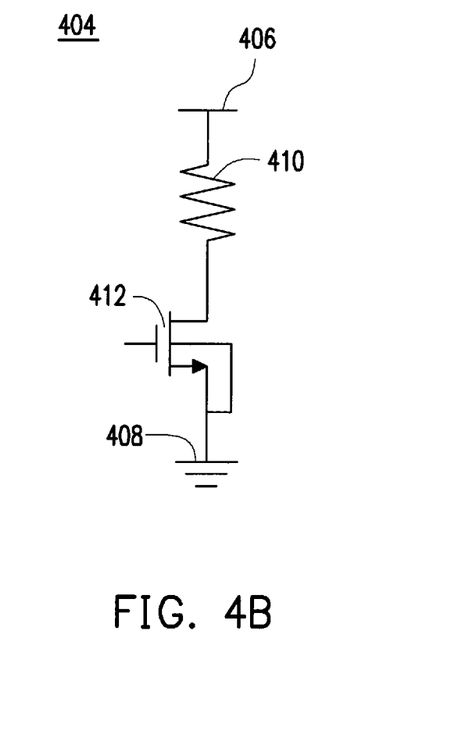
FIG. 4B illustrates one of the heating elements of the heating array, in accordance with some embodiments.

FIG. 4B illustrates one of the heating elements 404 of the heating array 106B, in accordance with some embodiments. As noted above, each of the heating elements 404 may include a resistor 410 and a switch 412. Accordingly, the resistor 410 of the heating element 404 may be directly coupled to the voltage source 406 and a respective switch 412. Also, each switch 412 may be coupled between the respective resistor 410 and the ground 408.

This topology of the heating elements 404 may be referred to as a switch type circuit topology. In contrast, a source follower type of circuit topology may have the resistor directly connected with ground and the switch directly connected with the voltage source. However, the source follower type of circuit topology needs to be implemented with a greater area than the switch type circuit topology for a heating element. Furthermore, this switch type circuit topology may have a greater maximum power than the source follower type of circuit topology. More specifically, a maximum power Pmax of the switch type circuit topology may be expressed as the following equation (7):

$$P\max = \frac{Vdd^2}{R} \quad (7)$$

In equation (7), Vdd may represent the voltage level of the voltage source 406 and R may represent the resistance of the resistor 410.

Although this application may refer to discrete time loop control for specific examples of thermal control, this type of discrete time loop control may be applied to any other type of tracking system within and/or beyond thermal control as desired for different applications in various embodiments. In certain embodiments, this discrete time loop based control may be applied in situations of cooling, instead of heating. For example, the heating array may be implemented instead as a cooling array with individual cooling elements, such as Seebeck circuits configured for cooling a local environment. In further embodiments, this discrete time loop based control may be applied in other types of tracking systems, such as satellite to ground tracking of an object, vibration and dampening control, motor control, and the like.

Figure 5:
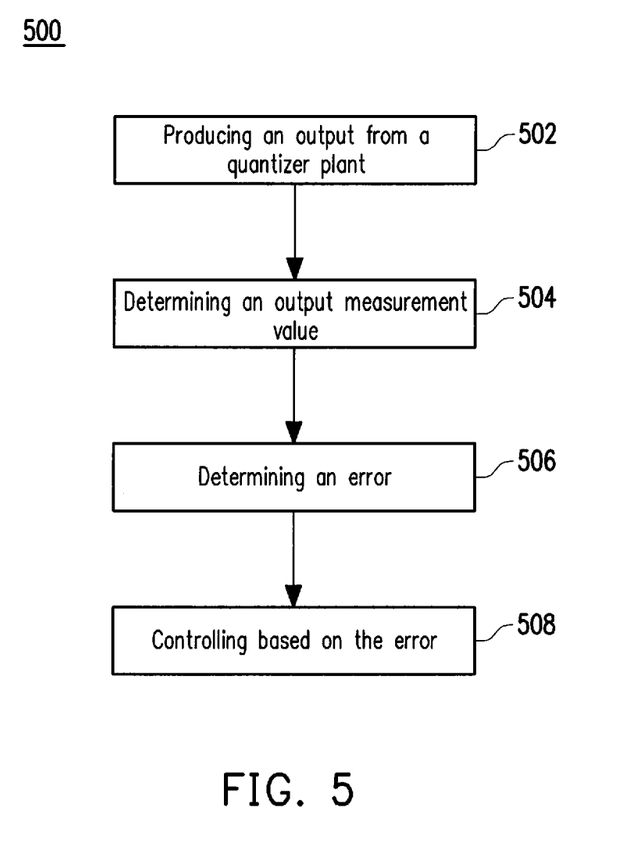
FIG. 5 is a flow chart of a discrete time loop control process, in accordance with some embodiments.

FIG. 5 is a flow chart of a discrete time loop control process 500, in accordance with some embodiments. The discrete time loop control process 500 may be produced by a discrete time loop control system, as noted above. It is noted that the process 500 is merely an example, and is not intended to limit the present disclosure. Accordingly, it is understood that additional operations may be provided before, during, and after the process 500 of FIG. 5, certain operations may be omitted, certain operations may be performed concurrently with other operations, and that some other operations may only be briefly described herein.

At operation 502, an output may be produced from a quantized plant. In certain embodiments, this output may be produced from an reference value input that is input into the discrete time loop control system. As noted above, the quantized plant 106 may reference a plant produced with a digital (e.g., quantized) process. For example, an output from a quantized plant may be heat produced by the quantized plant's heating array, which is controlled by the quantized plant's quantizer. The quantizer may produce a digital code that may control whether certain heating elements of the heating array are connected to a voltage source and configured to produce heat.

At operation 504, an output measurement value may be taken based on the output produced by the quantized plant. This output measurement value may be produced by a sensor configured to characterize the output produced by the quantized plant. For example, when the quantized plant produces heat as output, the output measurement value may be a temperature value as measured by a temperature sensor configured to characterize the heat as output.

At operation 506, an error may be determined. In certain embodiments, this error may be produced by an error amplifier, as discussed above. This error may represent a difference between the output measurement value produced by the sensor and the reference value input that is input into the discrete time loop control system. For example, the reference value input may be a reference temperature value (e.g., a target temperature value) and the output measurement value may be a temperature value determined from a temperature sensor configured to characterize the heat as output from the quantized plant (e.g., the quantized plant that includes a heating array).

At operation 508, the discrete time loop control process 500 may be controlled using a discrete time controller. The discrete time controller may be implemented using digital circuitry. For example, the discrete time controller may utilize at least one of an integrator controller, a proportional and integrator controller, or a proportional integral derivative controller. In certain embodiments, the discrete time loop control process 500 may then continue to loop back to operation 502.

In an embodiment, a circuit includes: an error amplifier; a temperature sensor coupled to the error amplifier; a discrete time controller coupled to the error amplifier, wherein the discrete time controller comprises digital circuitry; a multiple bits quantizer coupled to the discrete time controller, wherein the multiple bits quantizer produces a digital code output; and a heating array coupled to the multiple bits quantizer, wherein the heating array is configured to generate heat based on the digital code output.

In another embodiment, a circuit includes: an error amplifier; a sensor, wherein the sensor is coupled to the error amplifier; a discrete time controller coupled to the error amplifier, a quantizer coupled to the discrete time controller; and an array coupled to the quantizer.

In another embodiment, a method includes: producing an output of a process based on an reference value input, wherein the output is a temperature produced by a heating array; determining an output measurement value based on the output using a temperature sensor embedded within the heating array; determining an error between the output measurement value and the reference value input using an error amplifier; and controlling the process based on the error using a discrete time controller.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A discrete time loop based control system, comprising:
an error amplifier;
a temperature sensor coupled to an input of the error amplifier;
a discrete time controller coupled to an output of the error amplifier; and
a quantizer configured to produce a digital code for control of a heater, wherein the temperature sensor is configured to produce a value that characterizes the digital code output by the quantizer, wherein the heater comprises a plurality of heating elements each comprising a respective resistor coupled to a respective switch, wherein the respective switch comprises a first terminal, a second terminal and a third terminal, wherein the first terminal is connected to the respective resistor, the second terminal is connected to a ground, and the third terminal is controlled by a respective bit of the digital code output, and wherein the discrete time controller is configured to produce a control signal for controlling the quantizer.

2. The system of claim 1, wherein the discrete time controller is an integrator controller.

3. The system of claim 2, wherein the integrator controller comprises an operational amplifier with a first capacitor between an inverting input and an output.

4. The system of claim 3, wherein, at the operational amplifier, the inverting input is connected with a second switch and a non-inverting input is coupled to the ground.

5. The system of claim 4, wherein, the second switch is coupled to a third switch and a second capacitor.

6. The system of claim 5, wherein the second switch is driven by a first clock signal and the third switch is driven by a second clock signal, wherein the first clock signal and the second clock signal are non-overlapping clock signals with a same period.

7. The system of claim 1, wherein the digital code output comprises multiple bits that are each configured to control the plurality of heating elements.

8. The system of claim 7, wherein the discrete time controller is a proportional and integrator controller.

9. The system of claim 7, wherein the discrete time controller is a proportional integral derivative controller.

10. The system of claim 7, wherein each of the plurality of heating elements comprises a resistor with one end coupled to a voltage source and another end coupled to a switch to the ground.

11. A circuit, comprising:
an error amplifier;
a sensor, wherein the sensor is coupled to the error amplifier;
a discrete time controller coupled to an output of the error amplifier; and
a quantizer configured to produce a digital code for control of a heater, wherein the sensor is configured to produce a value that characterizes the digital code output by the quantizer, wherein the heater comprises a plurality of heating elements, wherein each of the plurality of heating elements comprises a respective resistor coupled to a respective switch, wherein the respective switch comprises a first terminal, a second terminal and a third terminal, wherein the first terminal is connected to the respective resistor, the second terminal is connected to a ground, and the third terminal is controlled by a respective bit of the digital code output, and wherein the discrete time controller is configured to produce a control signal for controlling the quantizer.

12. The circuit of claim 11, wherein the heating array is coupled to the quantizer, wherein the digital code is utilized by the heating array to control different switches within the array.

13. The circuit of claim 12, wherein the plurality of heating elements are monotonic.

14. The circuit of claim 11, wherein the sensor is a temperature sensor.

15. The circuit of claim 11, wherein the quantizer is a multiple bit quantizer.

16. A method, comprising:
producing an output of a process, wherein the output is a temperature;
determining an output measurement value based on the output using a temperature sensor;
determining an error between the output measurement value and a reference value;
generating a control signal based on the error; and
using the control signal to control the process with a quantizer, wherein the quantizer utilizes the control signal to generate a digital code, and wherein the digital code individually controls a plurality of heating elements of a heating array, wherein each of the plurality of heating elements comprises a respective resistor coupled to a respective switch, wherein the respective switch comprises a first terminal, a second terminal and a third terminal, wherein the first terminal is connected to the respective resistor, the second terminal is connected to a ground, and the third terminal is controlled by a respective bit of the digital code output.

17. The method of claim 16, wherein the quantizer comprises a multiple bit quantizer, and the process is performed by the multiple bit quantizer.

18. The method of claim 17, further comprising turning the heating array on or off based on the process.

19. The method of claim 17, further comprising turning different coils of the heating array on or off based on the digital code produced by the multiple bit quantizer.

20. The method of claim 16, wherein the discrete time controller is implemented in digital circuitry.

* * * * *